No. 831,913. PATENTED SEPT. 25, 1906.
L. A. WALKER.
HOOK.
APPLICATION FILED SEPT. 11, 1905.
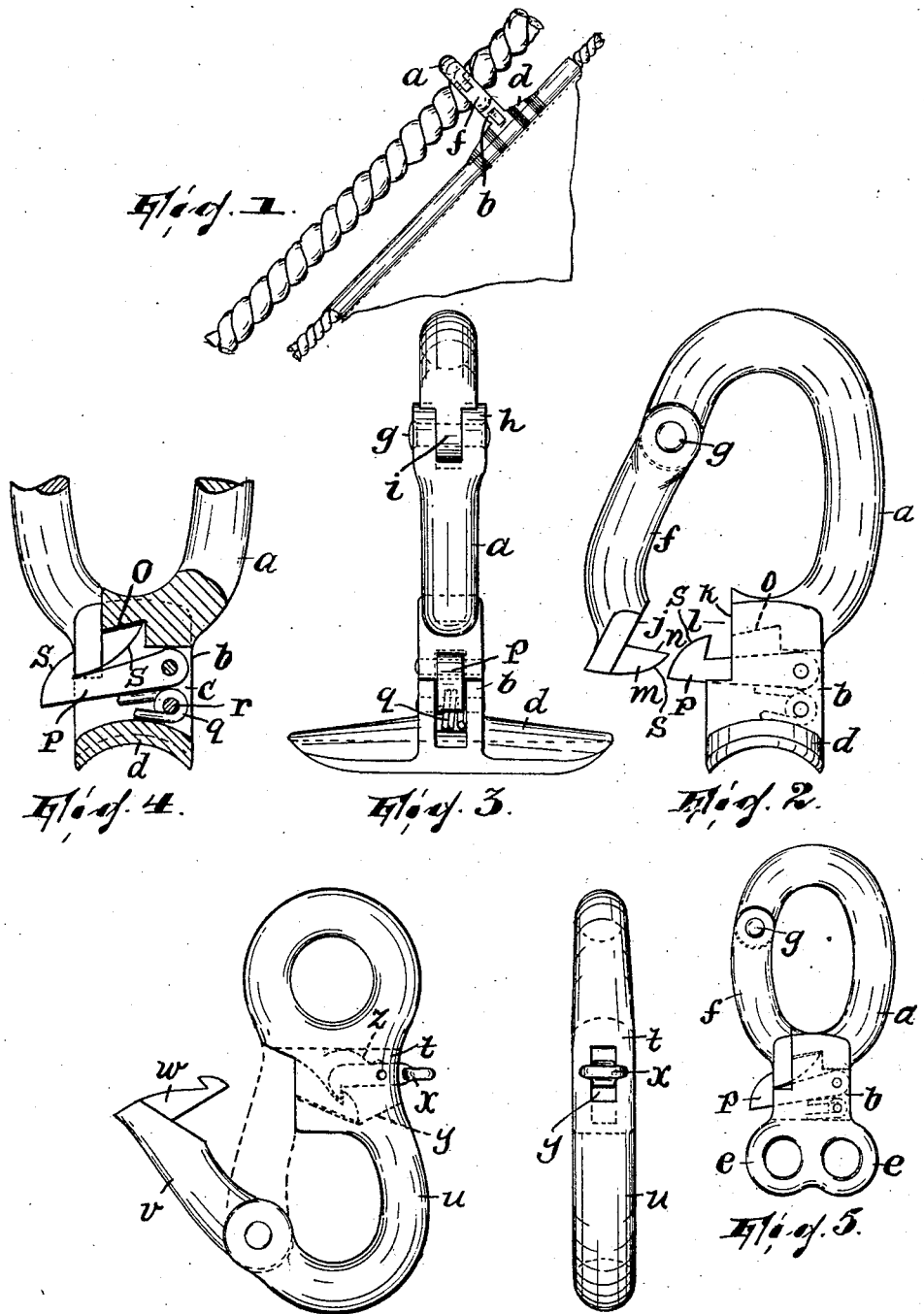
WITNESSES:
Wm D Bell
Adele Glatt
INVENTOR,
Louis A. Walker,
BY
Gartner Leonard,
ATTORNEYS

UNITED STATES PATENT OFFICE.

LOUIS A. WALKER, OF PORT JEFFERSON, NEW YORK.

HOOK.

No. 831,913.     Specification of Letters Patent.     Patented Sept. 25, 1906.

Application filed September 11, 1905. Serial No. 277,836.

*To all whom it may concern:*

Be it known that I, LOUIS A. WALKER, a citizen of the United States, residing in Port Jefferson, county of Suffolk, and State of New York, have invented certain new and useful Improvements in Hooks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to hooks or hanks for use in attaching awnings, sails, boat-painters, &c., to their holding means. Such hooks or hanks are often provided with guards or tongues to prevent their slipping off the rope, cable, bar, or the like with which they may be engaged.

The principal object of this invention is to so construct a hook or hank of this kind that, while being stout and substantial in construction, simple in form, easy to manipulate, and cheap to manufacture, shall be proof against accidental disengagement at all times and under all conditions from the holding means.

Referring to the accompanying drawings, Figure 1 shows my hook employed as a jib hook or hank. Figs. 2 and 3 are side and rear views of the hook shown in Fig. 1. Fig. 4 is a fragmentary view, partly in section, of the hook shown in Figs. 1 to 4. Fig. 5 shows the form of hook seen in Figs. 1 to 4, having its body in eyelet instead of cleat form; and Figs. 6 and 7 are side and front views of a modified form of the hook.

Referring first to Figs. 1 to 5, $a$ is the shank of the hook, and $b$ its body, the former being preferably of the form of a broken ellipse arranged with its longitudinal axis alined with the longitudinal axis of the body and having its removed or open portion adjacent the body. The body is penetrated in a plane coincident with that of the shank $a$ by an opening or recess $c$, and it is formed with an integral attaching means of some kind, such as a cleat $d$ or one or more eyelets $e$. $f$ is the tongue or guard. This is pivotally connected with the free end of the shank $a$, as at $g$. In the adaptation shown the hinge between these parts is formed by making the tongue $f$ forked shape, as at $h$, so as to receive the reduced portion $i$ of the shank $a$; but I of course do not wish to be limited to this detail of construction. The tongue $f$ has its free end formed flat, as at $j$, on the inside, so as to take against the corresponding flat face $k$ of a recess $l$, formed in the tongue side of the block $b$ and which permits the tongue when the hook is closed to complete the perfect ellipse form of the hook or hank. On the face $j$ of hook $f$ and near its free end is a lug $m$, whose flat face $n$, which is adjacent the pivot of said tongue, is adapted to take against a corresponding flat face $o$ of the opening $c$ of the hook when the hook is closed. The face $n$ of the tongue forms an acute angle with the longitudinal axis of the latter, and since face $o$ in the opening $c$ of the body of the hook is disposed at a corresponding angle any longitudinal strain on the hook tending to distort the hook, as by forcing the free end of its shank outwardly or otherwise, is at once perfectly resisted, and the integrity of the hook remains practically as perfect as if the ellipse were integral or unbroken throughout. In order to automatically keep the tongue $f$ in the closed position, I provide a pawl $p$, which is pivoted in the opening $c$ of the body $b$ and adapted to hook over the free end of the tongue, (see Fig. 4,) the same being controlled by a spring $q$, coiled about a pin $r$ and bearing at one end against the pawl and at the other against the opposite side of the opening $c$. The parts are adapted to snap into locking engagement with each other on pressing the tongue home by forming the lug $m$ and the pawl $p$ with rounded or inclined engaging faces $s$.

Referring now to Figs. 6 and 7, the body $t$, shank $u$, and tongue $v$ are shown as formed and arranged substantially as in the corresponding parts in the other figures. Here, however, the tongue has a hook-shaped lug $w$, which when the tongue is closed is automatically engaged by a hook-shaped pawl $x$, pivoted in the opening $y$ of the body $t$ of the hook, said pawl being actuated by a plate-spring $z$, interposed between itself and the opposite wall of the opening $y$. The pawl protrudes from the back of the hook, as shown, so that it may be conveniently manipulated to cause it to release the tongue.

Having thus fully described my invention, what I claim as new, and desire to secure by Letters Patent, is—

A hook or hank comprising the body, a hook-shaped shank formed integrally with said body, the extremity of said shank projecting toward the body, a tongue adapted to close the opening between said body and the shank and pivoted in the latter, said tongue having a lug at its free end and on the side thereof adjacent said body, said lug being formed with a flat face on the side thereof adjacent the pivot of the tongue, and the hook having an opening or recess in the body portion thereof adapted to receive said lug and having that wall or face of said recess which is opposed to the flat face of said lug when the tongue is closed disposed substantially coincident with said face of the lug, a pivoted locking-pawl movable toward and away from said wall or face of the recess, located in said recess and projecting therefrom at its free end, said pawl being engageable with the tongue to secure the same in the closed position, and a spring interposed between said pawl and the wall or face of said recess opposite the first-named wall or recess thereof, substantially as described.

In testimony that I claim the foregoing I have hereunto set my hand this 6th day of September, 1905.

LOUIS A. WALKER.

Witnesses:
 JACOB S. DWYER,
 HAROLD E. DAVIS.